United States Patent
Kis et al.

(10) Patent No.: US 9,567,893 B2
(45) Date of Patent: Feb. 14, 2017

(54) SYSTEM AND METHOD FOR CONTROLLING AN ENGINE COOLING FAN

(71) Applicant: Modine Manufacturing Co., Racine, WI (US)

(72) Inventors: Michael J Kis, Burlington, WI (US); Derek R Boom, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 251 days.

(21) Appl. No.: 14/139,078

(22) Filed: Dec. 23, 2013

(65) Prior Publication Data
US 2015/0176469 A1 Jun. 25, 2015

(51) Int. Cl.
| | |
|---|---|
| *F01P 1/06* | (2006.01) |
| *F01P 7/04* | (2006.01) |
| *F02B 29/04* | (2006.01) |
| *F02M 35/10* | (2006.01) |
| *F01P 5/10* | (2006.01) |

(52) U.S. Cl.
CPC .................. *F01P 7/048* (2013.01); *F01P 1/06* (2013.01); *F02B 29/0456* (2013.01); *F02B 29/0475* (2013.01); *F02B 29/0493* (2013.01); *F02M 35/1038* (2013.01); *F01P 2005/105* (2013.01); *Y02T 10/146* (2013.01)

(58) Field of Classification Search
CPC ...................................... F01P 1/06; F01P 7/048
USPC .......................................... 165/121; 318/454
See application file for complete search history.

(56) References Cited

U.S. PATENT DOCUMENTS

| | | | | |
|---|---|---|---|---|
| 4,409,933 A | * | 10/1983 | Inoue ...................... | F01P 11/16 123/41.12 |
| 5,947,189 A | * | 9/1999 | Takeuchi .............. | F04D 25/166 123/41.31 |
| 6,037,732 A | * | 3/2000 | Alfano ............... | G05D 23/1912 318/254.2 |
| 6,040,668 A | * | 3/2000 | Huynh ............... | G05D 23/1912 318/254.2 |
| 6,239,991 B1 | * | 5/2001 | Ajro ......................... | H02P 7/29 363/41 |
| 6,809,497 B2 | * | 10/2004 | Kudo ....................... | H02P 6/08 318/34 |
| 6,924,568 B2 | * | 8/2005 | Dhuey .................. | F04D 27/004 307/130 |
| 7,038,408 B2 | * | 5/2006 | Lin ......................... | H02P 6/002 318/268 |
| 9,083,265 B1 | * | 7/2015 | Maroney ................... | H02P 5/50 |
| 2001/0039927 A1 | * | 11/2001 | Oishi ...................... | F01P 7/048 123/41.12 |
| 2011/0220042 A1 | * | 9/2011 | Suzuki ................... | F01P 7/048 123/41.12 |

(Continued)

*Primary Examiner* — Devon Russell
(74) *Attorney, Agent, or Firm* — Michael Best & Friedrich LLP

(57) ABSTRACT

A system and method of operating a cooling system for a vehicle engine, wherein one or more motors are operable to rotate one or more fans. Each of the one or more motors is controlled by a motor controller associated with the motor, in response to a control signal received from a system controller and an enable signal received from the vehicle. The motor controller operates the motor at a speed based upon the control signal if the control signal is received, and operates the motor at a predetermined speed if the control signal is not received but the enable signal is received.

12 Claims, 4 Drawing Sheets

(56) References Cited

U.S. PATENT DOCUMENTS

2012/0205171 A1\* 8/2012 Takishita .............. E02F 9/2095
　　　　　　　　　　　　　　　　　　　　　　　180/68.1

\* cited by examiner

SYSTEM AND METHOD FOR CONTROLLING AN ENGINE COOLING FAN

BACKGROUND

The present invention relates to a system and method for controlling one or more fans configured to promote the cooling of an internal combustion engine.

Engine cooling systems typically include one or more heat exchangers (e.g., a radiator, a charge-air cooler, an oil cooler, etc.) and one or more fans. The heat exchanger(s) and the fan(s) are configured to cool the internal combustion engine and/or fluids associated with the internal combustion engine.

SUMMARY

In some embodiments, the invention provides a cooling system for a vehicle engine, wherein the cooling system is powered by a power source and includes a heat exchanger, a system controller, a motor electrically connected to the power source, a fan driven by the motor, and a motor controller. The motor controller is electrically connected to the system controller, the power source and the motor, and is configured to receive power from the power source, receive an enable signal from the vehicle, and to receive a control signal from the system controller. Upon receiving the control signal, the motor controller operates the motor at a first speed based on the control signal. If the first control signal is not received, but the enable signal is received, the motor controller operates the motor at a second speed.

Some embodiments of the present invention provide a method of operating a cooling system for a vehicle engine, wherein the cooling system includes a motor operable to rotate a fan. The method includes determining if a control signal has been received; operating the motor to rotate the fan at a first speed if the control signal has been received, wherein the first speed is based on the control signal; and operating the motor to rotate the fan at a second speed if the control signal has not been received.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
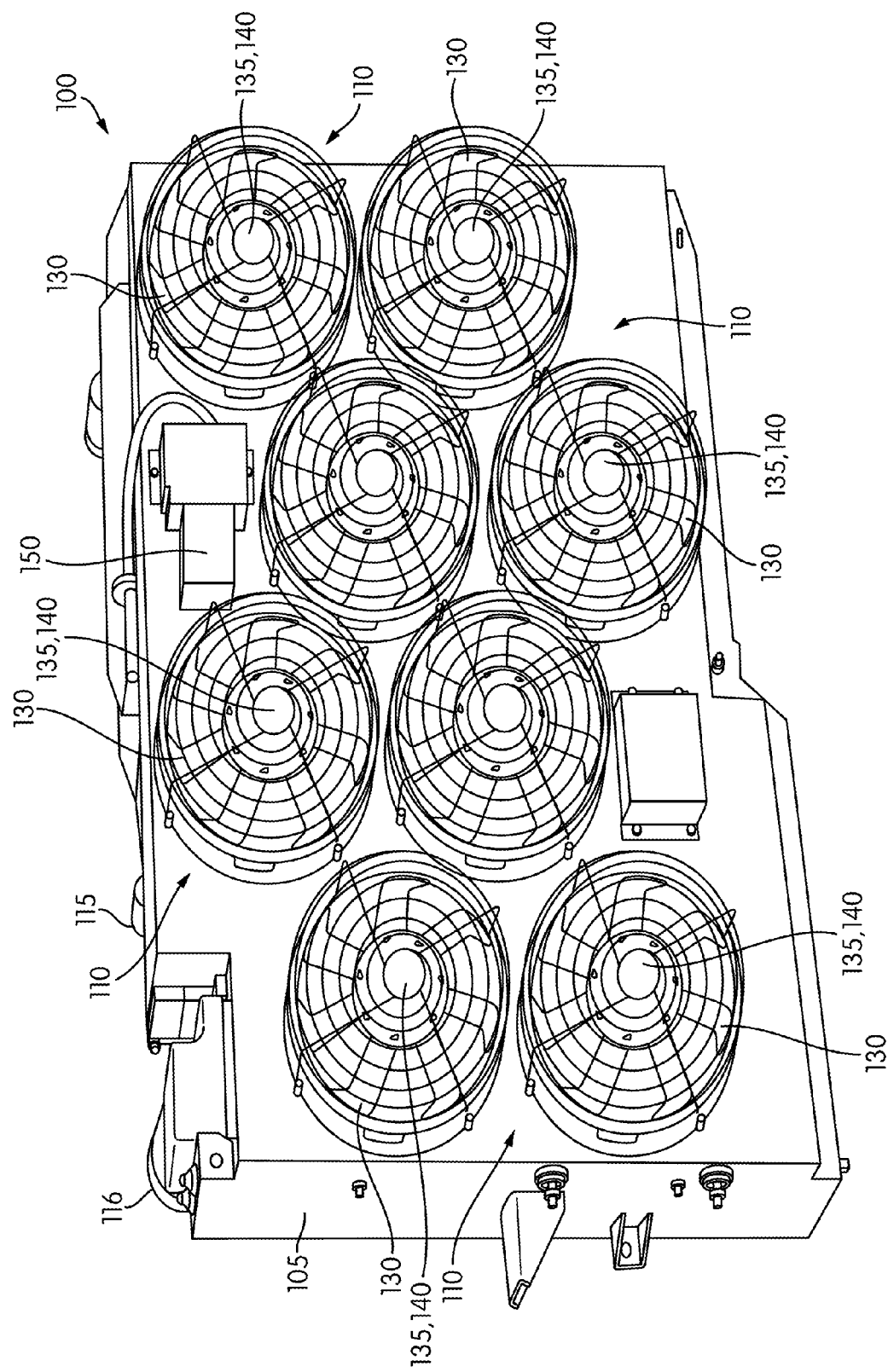
FIG. 1 is a perspective view of a cooling system for a vehicle engine according to one embodiment of the invention.

FIG. 1 is a perspective view of a cooling system 100 for use in an internal combustion engine driven vehicle. The cooling system 100 includes an assembly of heat exchangers 105 and motor and fan assemblies 110. The cooling system 100 cools, for example, an internal combustion engine such as a vehicle engine (not shown).

Figure 4:
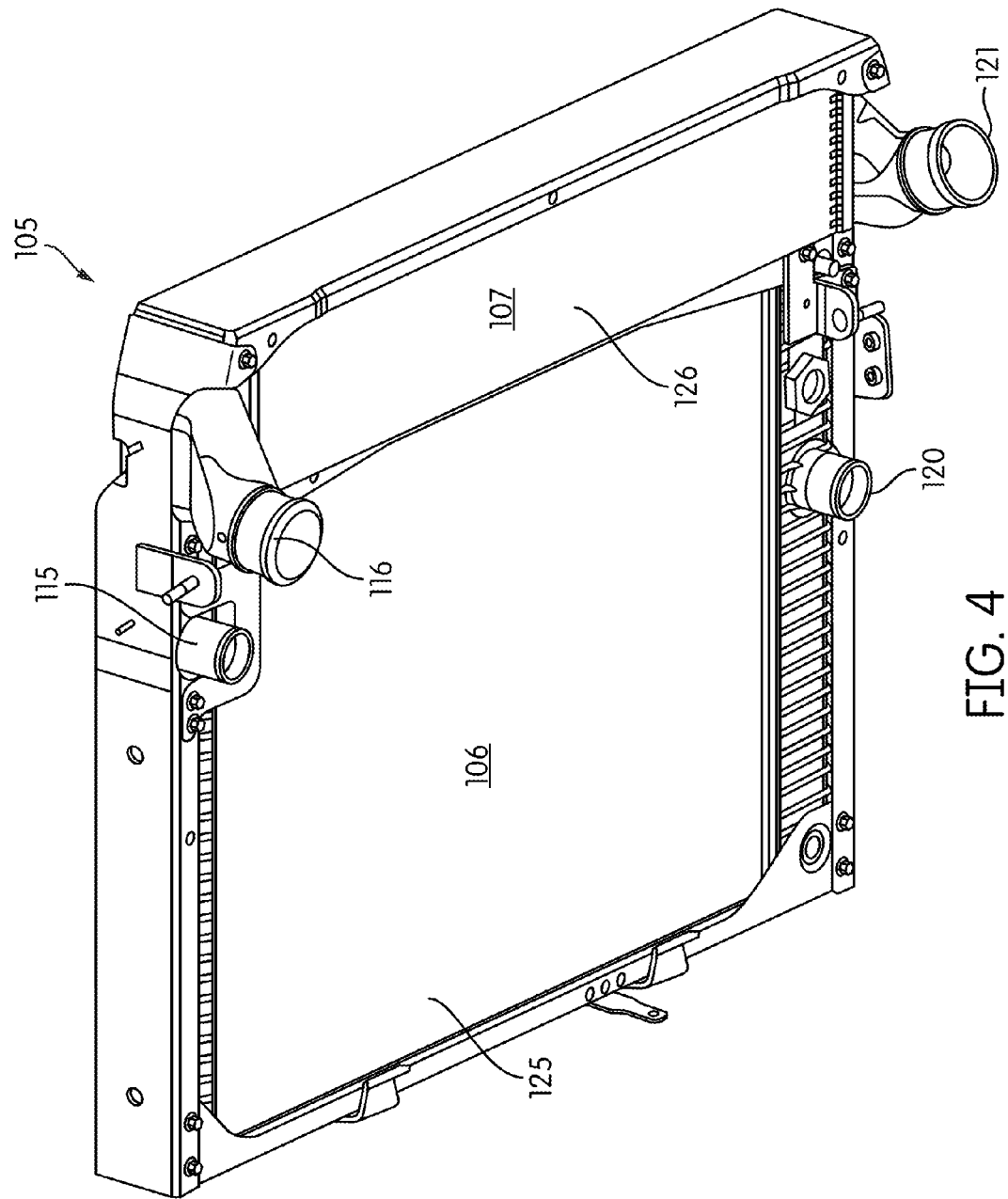
FIG. 4 is perspective view of certain portions of the cooling system of FIG. 1.

The assembly of heat exchangers 105 is shown in greater detail in FIG. 4, and includes a radiator 106 and a charge-air cooler 107. The radiator 106 cools a liquid engine coolant that is pumped through a cooling jacket of the internal combustion engine in order to regulate the engine temperature. The illustrated radiator 106 includes an inlet 115, an outlet 120, and a core 125. In operation, warm liquid enters the radiator 106 via the inlet 115. The warm liquid passes through a series of tubes of the core 125. As the liquid passes through the core 125, heat from the liquid is rejected to air passing over the tubes and the liquid is cooled. The cooled liquid exits the radiator 106 via the outlet 120. The charge-air cooler cools a flow of pressurized combustion air for the internal combustion engine. The illustrated charge air cooler includes an inlet 116, an outlet 121, and a core 126. In operation, hot charge-air enters the charge-air cooler via the inlet 116. The hot charge-air passes through a series of tubes of the core 126. As the charge-air passes through the core 126, heat from the charge-air is rejected to air passing over the tubes and the charge-air is cooled. In some embodiments, additional heat exchangers such as, for example, oil coolers, transmission coolers, refrigerant condensers, and the like can also be included within the assembly of heat exchangers 105.

The motor and fan assemblies 110 circulate air through the assembly of heat exchanger 105 (for example the core 125 of the radiator 106 and the core 126 of the charge-air cooler 107) to provide the necessary cooling air. The assemblies 110 each include a fan 130, a motor 135, and a motor controller 140. Although shown in the illustrated embodiment as including eight motor and fan assemblies 110, the cooling system 100 may have one or any other number of motor and fan assemblies 110. In some embodiments, a subset of the fan assemblies 110 can be dedicated to each of the heat exchangers within the assembly of heat exchanger 105, so that the rate of cooling within each of the heat exchangers can be controlled independently of the rate of cooling of the other heat exchangers. For ease of description, only one of the motor and fan assemblies 110 is described hereinafter, although it will be understood that the description can apply to any number of the other motor and fan assemblies 110, if present.

The motor 135 rotates the fan 130. The motor 135 is an electrical motor, such as but not limited to a direct-current motor operable at variable speeds. In some embodiments, the motor 135 is a brushless direct-current (BLDC) motor. In other embodiments, the motor 135 can be a variety of other types of motors, including but not limited to a brush DC motor, a stepper motor, a synchronous motor, or other direct-current or alternating-current motors.

The motor controller 140 operates the motor 135. The motor controller 140 includes a plurality of electrical and electronic components that provide power, operational control, and protection to the components and modules within the motor controller 140 and/or the motor 135. For example, the motor controller 140 includes, among other things, a processing unit (e.g., a microprocessor, a microcontroller, or another suitable programmable device) and a memory unit. In some embodiments, the motor controller 140 is implemented partially or entirely on a semiconductor (e.g., a field-programmable gate array ["FPGA"] semiconductor) chip, such as a chip developed through a register transfer level ("RTL") design process. In one example, upon receiving a control signal, the motor controller 140 controls and/or operates the switching of a plurality of electronic switches (e.g., FETs), in order to selectively drive the motor 135 at a speed. In some embodiments, the motor controller 140 and the motor 135 form a single unit. In other embodiments, the motor controller 140 and the motor 135 are individual components of the motor and fan assembly 110.

The motor controller 140 includes a plurality of connections (e.g., inputs, outputs, input/outputs, etc.). In some embodiments, the plurality of connections include a control signal connection, a battery positive connection, a battery negative (e.g., ground) connection, an enable signal connection, and a diagnostic connection.

The cooling system 100 further includes a system controller 150. The system controller 150 is in communication with the motor controllers 140 through at least some of the plurality of connections of each of the motor controllers 140. For example, the system controller 150 and a motor controller 140 can communicate along a control signal connection and a diagnostic connection.

Figure 2:
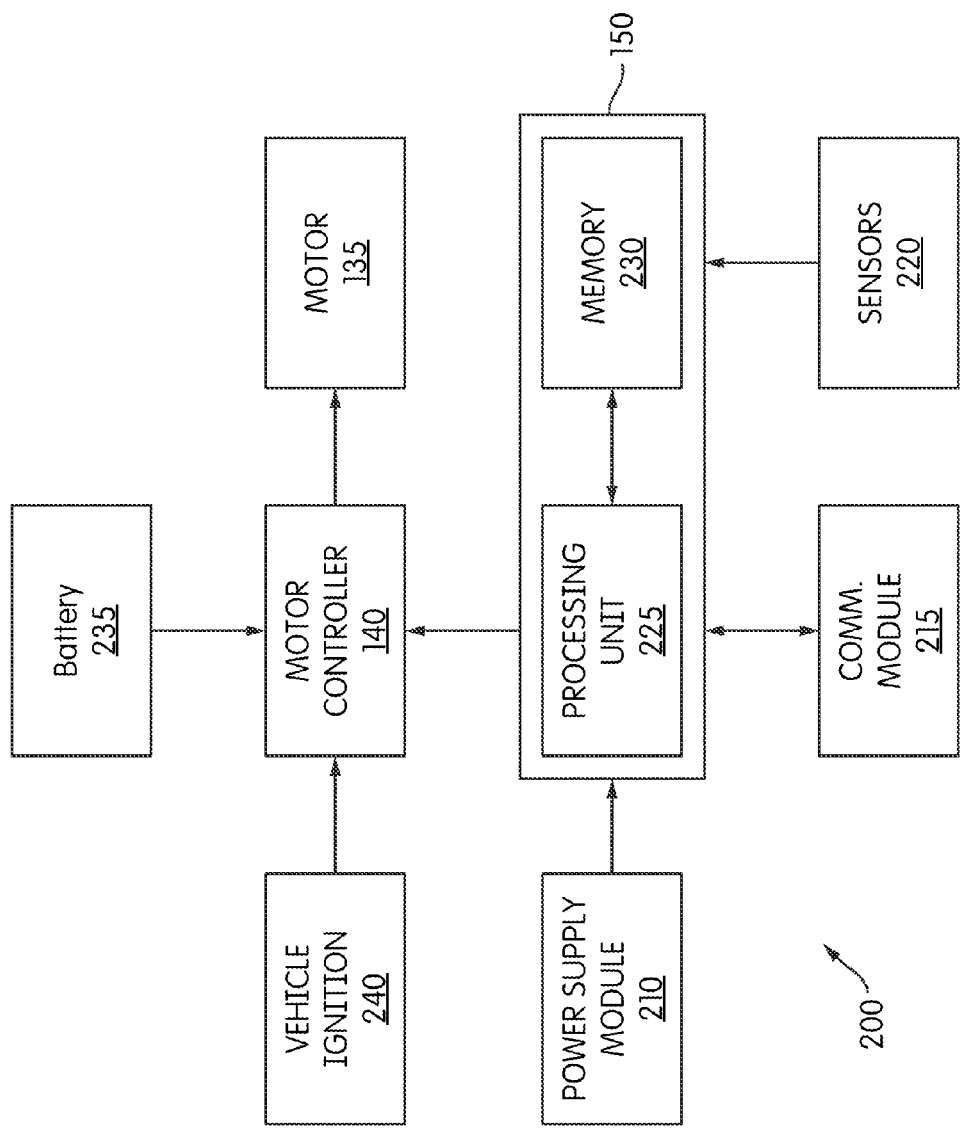
FIG. 2 is a block diagram of a control system of the cooling system of FIG. 1.

FIG. 2 is a block diagram illustrating a control system 200 of the cooling system 100. The control system 200 includes the system controller 150. The system controller 150 is electrically and/or communicatively connected to a variety of modules or components of the control system 200 and cooling system 100. For example, the illustrated system controller 150 is connected to the motor controller 140, a power supply module 210, a communications module 215, and one or more sensors 220. The system controller 150 can include combinations of hardware and software that are operable to, among other things, control the operation of the cooling system 100, and specifically, the motor and fan assembly 110 of the cooling system 100.

The system controller 150 can include a plurality of electrical and electronic components that provide power, operational control, and protection to the components and modules within the system controller 150 and/or the cooling system 100. For example, the system controller 150 includes, among other things, a processing unit 225 (e.g., a microprocessor, a microcontroller, or another suitable programmable device) and a memory 230. In some embodiments, the system controller 150 is implemented partially or entirely on a semiconductor (e.g., a field-programmable gate array ["FPGA"] semiconductor) chip, such as a chip developed through a register transfer level ("RTL") design process.

The memory 230 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The illustrated processing unit 225 is connected to the memory 230 and executes software instructions that are capable of being stored in a RAM of the memory 230 (e.g., during execution), a ROM of the memory 230 (e.g., on a generally permanent basis), or another non-transitory computer readable medium such as another memory or a disc. Software included in some implementations of the cooling system 100 can be stored in the memory 230 of the system controller 150. The software can include, for example, firmware, one or more applications, program data, filters, rules, one or more program modules, and other executable instructions. The system controller 150 is configured to retrieve from memory and execute, among other things, instructions related to the control processes and methods described herein. In other constructions, the controller 150 includes additional, fewer, or different components.

The illustrated power supply module 210 receives power from a power supply and outputs a nominal DC voltage to the system controller 150 and optionally to other components or modules of the cooling system 100. In some embodiments, the power supply module 240 may receive power from one or more batteries or battery packs, and may receive that power by way of a vehicle ignition system. In some embodiments, the one or more batteries or battery packs further provide power to a vehicle and components of the vehicle. In other embodiments, the power supply module 210 may receive power from other grid-independent power sources (e.g., a solar panel, etc.).

In the illustrated embodiment, a vehicle ignition system 240 is electrically connected to and outputs a nominal DC voltage (e.g., 5V, 10V, 20V, 24V, etc.) to the motor controller 140. In some embodiments, the voltage output by the vehicle ignition system 240 functions as an enable signal. In some embodiments, the vehicle ignition system 240 is electrically connected to the motor controller 140 at a vehicle ignition connection of the motor controller 140. The motor controller 140 is also electrically connected to one or more batteries 235 via a battery positive connection and a battery negative (e.g., ground) connection. In some embodiments the batteries 235 can be replaced by an alternate power source.

The communications module 215 provides analog and/or digital communications from the system controller 150 to outside devices. In some embodiments, the communications module 215 outputs diagnostic information concerning the controller 150 and/or other components of the cooling system 100. The communications module 215 may include an output driver in the form of a digital driver such as SAE J1939 or CAN bus for communicating directly to the vehicle's data bus, or the communications module 215 may generate another suitable analog or digital signal depending on the needs of the specific application.

The one or more sensors 220 sense any number of a variety of characteristics of the cooling system 100 and the internal combustion engine. For example, the one or more sensors 220 can sense characteristics of the motor 135, including but not limited to rotational speed, torque, power, voltage, current, and temperature. In some embodiments, the one or more sensors 220 include one or more temperature sensors configured to sense, for example, a temperature of the cooling system 100, a temperature of the radiator 106 or portions of the radiator 106, a temperature of the charge-air cooler 107 or portions of the charge-air cooler 107, and/or a temperature of the internal combustion engine being cooled.

In operation, the system controller 150 outputs a control signal to the motor controller 140. The motor controller 140 receives the control signal and operates the motor 135 based on the control signal. In some embodiments, the control signal is a pulse-width modulated signal. The pulse-width modulated signal can have a duty cycle (e.g., 10%, 50%, 100%, etc.). In some embodiments, the duty cycle corresponds to an operating speed of the motor 135 (e.g., 10% of full speed, 50% of full speed, 100% of full speed, etc.).

In some embodiments, during a standby mode the controller 150 will output a standby control signal (e.g., a control signal having a 3% duty cycle) having a standby speed. Thus, during the standby mode, the motor controller 140 will receive the standby control signal from the controller 150 and operate the motor 135 at the predetermined standby speed based on the standby control signal. In some such embodiments the standby speed is zero.

During operation, the system controller 150 receives one or more sensed characteristics from the one or more sensors 220. The system controller 150 may output a different control signal to the motor controller 140 based on the one or more sensed characteristics. For example, the system controller 150 may receive a temperature of the cooling system 100 or various components of the cooling system 100. The system controller 150 may increase, decrease, or maintain the operating speed of the motor 135 by outputting a control signal based on the received temperature(s). The system controller 150 may output a first control signal to a first motor controller 140, and a second control signal different in value from the first control signal to a second motor controller 140.

If during operation the motor controller 140 receives an enable signal from the vehicle ignition system 240 but does not receive a control signal (e.g., a normal control signal or a standby control signal) from the system controller 150, or in some embodiments receives a control signal having a 0% duty cycle, the motor controller 140 waits for a predetermined time (e.g., three-seconds, five-seconds, ten-seconds, etc.) and then operates the motor 135 at a predetermined speed (e.g., a default speed of approximately 3750 RPM). In alternative embodiments, the motor controller 140 does not wait for a predetermined time (after failing to receive a control signal or a control signal having a 0% duty cycle) to operate the motor 135 in such a manner, and instead immediately operates the motor 135 at the predetermined speed.

Chart 1 below illustrates an example operation of the cooling system 100, including whether the motor and fan assembly 110 is receiving a control signal from the system controller 150 and/or is receiving a control signal from the vehicle ignition system 240, and the corresponding operation of the motor and fan assembly 110. In operation, when the motor and fan assembly 110 does not receive either of a control signal from the system controller 150 and an enable signal from the vehicle ignition system 240, the motor and fan assembly 110 operates the motor 135 at zero RPMs. If the motor and fan assembly 110 does not receive a control signal from the system controller 150, but receives an enable signal from the vehicle ignition system 240, the motor and fan assembly 110 operates the motor 135 at a predetermined speed (e.g., 3750 RPMs). If the motor and fan assembly 110 receives a control signal from the system controller 150 but does not receive an enable signal from the vehicle ignition system 240, the motor and fan assembly 110 operates the motor 135 at a speed according to the control signal from the system controller 150. Such an operation may occur if there is a failure of the vehicle ignition system 240, or an issue with the wiring between the vehicle ignition system 240 and the motor and fan assembly 110. If the motor and fan assembly 110 receives a control signal from the system controller 150 and receives an enable signal from the vehicle ignition system 240, the motor and fan assembly 110 operates the motor 135 at a speed according to the control signal from the controller 150.

| Control Signal from System Controller 150 | Enable Signal from Vehicle Ignition System 240 | Motor & Fan Assembly 110 Status |
|---|---|---|
| OFF | OFF | OFF |
| OFF | ON | Operates at predetermined speed (e.g., 3750 RPMs). |
| ON | OFF | Operates at speed according to control signal. |
| ON | ON | Operates at speed according to control signal. |

In embodiments having more than one motor and fan assembly 110, such as the illustrated embodiment, the system controller 150 may be operable to output a plurality of control signals, each having different duty cycles, to the plurality of motor controllers 140. Thus, the system controller 150 can be operable to control the various motor and fan assemblies 110 at different speeds, or one or more motor and fan assemblies 110 at a standby speed. For example, the system controller 150 may operate a first motor and fan assembly 110 at a first speed, a second motor and fan assembly 110 at a second speed, and a third motor and fan assembly 110 at a standby speed.

Figure 3:
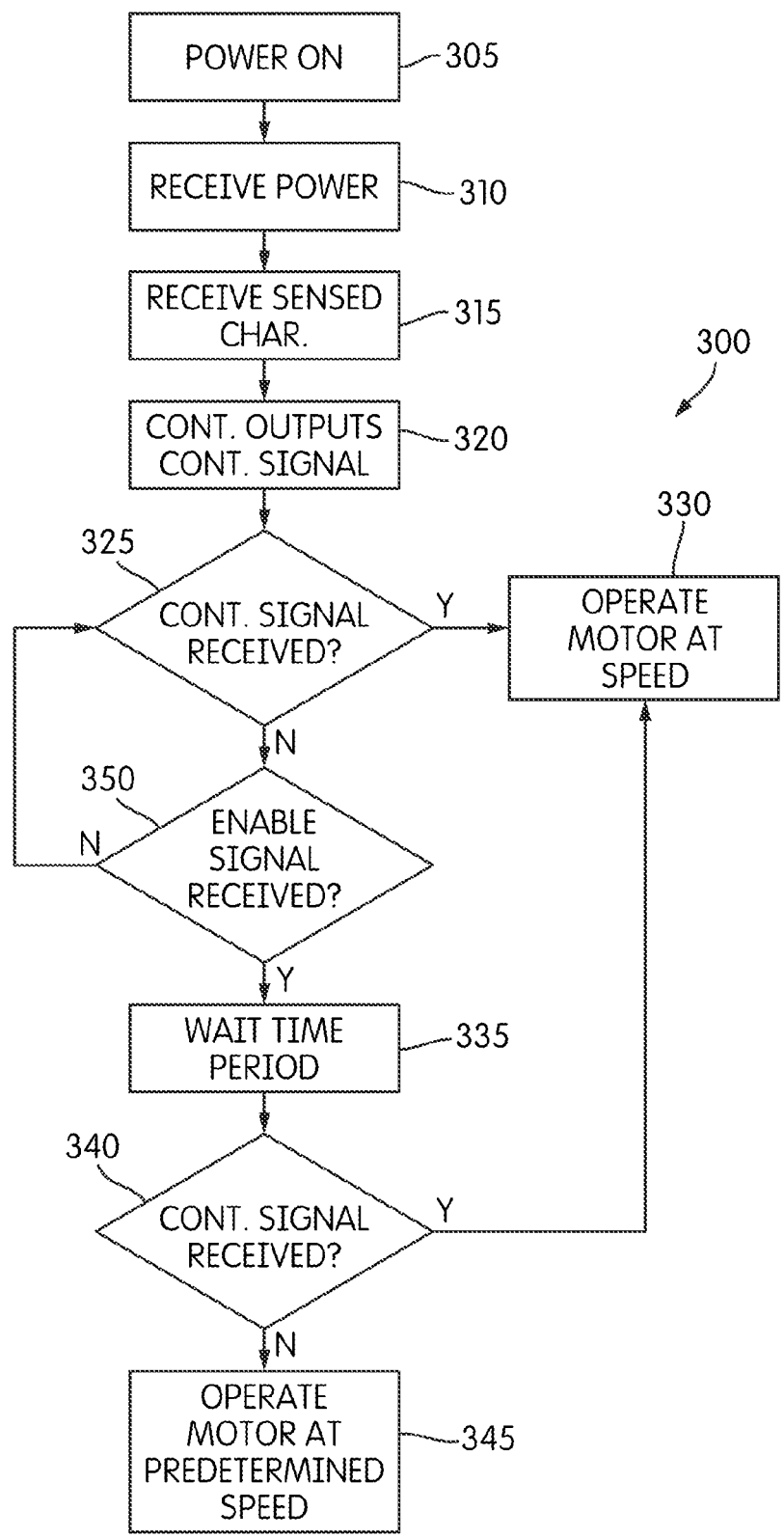
FIG. 3 is a flow chart illustrating a process of the cooling system of FIG. 1.

FIG. 3 illustrates an operation 300 of the cooling system 100 according to an embodiment of the present invention. The operation 300 begins by the vehicle turning on (Step 305). The system controller 150 receives power from a power source (Step 310). The system controller 150 receives one or more sensed characteristics (Step 315), and outputs a control signal based on at least the one or more sensed characteristics (Step 320). The motor controller 140 determines if the control signal has been received (Step 325). If the control signal has been received, the motor controller 140 operates the motor 135 based on the control signal (Step 330). If the control signal has not been received, the motor controller 140 determines is an enable signal has been received (step 350). If an enable signal has been received, the motor controller 140 waits for a predetermined time period (Step 335). The motor controller 140 determines if the control signal has been received during the predetermined time period (Step 340). If the motor controller 140 has received the control signal within the predetermined time period, the operation 300 proceeds to Step 330. If the motor controller 150 has not received the control signal within the predetermined time period, the motor controller 140 operates the motor 135 at a predetermined operating speed (e.g., the default speed) (Step 345). If during step 350 an enable signal has not been received, then the motor controller 140 does not operate the motor 135.

As one particular advantage of the above described operation, a failure of the system controller 150 does not result in a shut-down of the cooling system 100, provided that an enable signal from the vehicle ignition system 240 is received by a motor controller 140. As a result, the vehicle would still be able to be driven to, for example, a garage or repair facility so that the system controller 150 could be replaced. The presence of an electrical connection between the vehicle ignition system 240 and each of the motor controllers 140 is not, however, required for the operation of the cooling system 100 in the case of a non-faulty system controller 150, so that failure probabilities of the system do not increase by the addition of such a connection.

Thus, the invention provides, among other things, a system and method for controlling one or more fans configured to promote the cooling of an internal combustion engine. Various features and advantages of the invention are set forth in the following claims.

What is claimed is:

1. A method of operating a cooling system for a vehicle engine, the cooling system including a motor operable to rotate a fan and a motor controller operable to drive the motor, the method comprising:
supplying electrical power to the motor controller from an electrical power source;
determining if a control signal has been received by the motor controller;
determining if an enable signal from a source separate from the source of the control signal has been received by the motor controller; and
operating the motor controller to drive the motor at a non-zero speed if at least one of the control signal and the enable signal is received,
wherein the control signal is a pulse-width modulated signal having a duty cycle ranging from 0% to 100% and wherein the non-zero speed is a predetermined speed if the control signal is received with a duty cycle that is less than a standby duty cycle and the enable signal is received by the motor controller, and wherein the standby duty cycle is 3%.

2. The method of claim 1, wherein the enable signal is delivered by a vehicle ignition system.

3. The method of claim 1, wherein the electrical power source is a vehicle battery and wherein the electrical power is supplied by a battery positive connection and a battery negative connection.

4. A method of operating a cooling system for a vehicle engine, the cooling system including a motor operable to rotate a fan and a motor controller operable to drive the motor, the method comprising:
supplying electrical power to the motor controller from an electrical power source;
determining if a control signal has been received by the motor controller;
determining if an enable signal from a source separate from the source of the control signal has been received by the motor controller; and
operating the motor controller to drive the motor at a non-zero speed if at least one of the control signal and the enable signal is received,
wherein the control signal is a pulse-width modulated signal having a duty cycle ranging from 0% to 100%, wherein the non-zero speed is proportional to the control signal if the control signal is received with a duty cycle that is greater than a standby duty cycle, and wherein the standby duty cycle is 3%.

5. The method of claim 4, wherein the enable signal is delivered by a vehicle ignition system.

6. The method of claim 4, wherein the electrical power source is a vehicle battery and wherein the electrical power is supplied by a battery positive connection and a battery negative connection.

7. A method of operating a cooling system for a vehicle engine, the cooling system including a system controller, one or more sensors, and a plurality of motor and fan assemblies, the method comprising:
supplying electrical power to the plurality of motor and fan assemblies from an electrical power source;
receiving one or more sensed characteristics from the one or more sensors at the system controller;
determining a desired operating speed for each of the plurality of motor and fan assemblies based on the one or more sensed characteristics;
sending, from the system controller to each of the plurality of motor and fan assemblies, a control signal having a pulse-width modulation duty cycle corresponding to the desired operating speed, the duty cycle ranging between a standby duty cycle and 100%, the standby duty cycle being greater than 0%;
sending an enable signal from a source other than the system controller to each of the plurality of motor and fan assemblies; and
operating any of the motor and fan assemblies receiving a control signal having a duty cycle equal to the stand-by duty cycle at zero speed, operating any of the motor and fan assemblies receiving a control signal having a duty cycle greater than the standby duty cycle at a non-zero speed corresponding to the duty cycle, and operating any of the motor and fan assemblies that receive the enable signal and that do not receive a control signal having a duty cycle at least equal to the standby duty cycle at a predetermined non-zero speed.

8. The method of claim 7, wherein the standby duty cycle is 3%.

9. The method of claim 7, wherein the enable signal is delivered by a vehicle ignition system.

10. The method of claim 7, wherein the electrical power source is a vehicle battery and wherein the electrical power is supplied by a battery positive connection and a battery negative connection.

11. The method of claim 7, wherein operating any of the motor and fan assemblies that receive the enable signal and that do not receive a control signal having a duty cycle at least equal to the standby duty cycle at a predetermined non-zero speed further comprises:
determining that a control signal having a duty cycle at least equal to the standby duty has not been received;
waiting a predetermined time period; and
determining that a control signal having a duty cycle at least equal to the standby duty still has not been received.

12. The method of claim 7, wherein at least one of the one or more sensed characteristics is a temperature.

* * * * *